(12) United States Patent
Ejerhed et al.

(10) Patent No.: US 7,657,425 B2
(45) Date of Patent: Feb. 2, 2010

(54) METHOD AND SYSTEM FOR INFORMATION EXTRACTION

(75) Inventors: Eva Ingegerd Ejerhed, Stockholm (SE); Peter A. Braroe, Stockholm (SE)

(73) Assignee: Hapax Limited, London (GB)

( * ) Notice: Subject to any disclaimer, the term of this patent is extended or adjusted under 35 U.S.C. 154(b) by 0 days.

(21) Appl. No.: 11/723,079

(22) Filed: Mar. 16, 2007

(65) Prior Publication Data

US 2007/0168181 A1    Jul. 19, 2007

Related U.S. Application Data

(60) Continuation of application No. 11/032,075, filed on Jan. 11, 2005, now Pat. No. 7,194,406, which is a division of application No. 09/599,563, filed on Jun. 23, 2000, now Pat. No. 6,842,730.

(30) Foreign Application Priority Data

Jun. 22, 2000    (SE)    .................................... 0002368

(51) Int. Cl.
  *G06F 17/27* (2006.01)
  *G06F 17/20* (2006.01)
  *G06F 17/30* (2006.01)
(52) U.S. Cl. .................. 704/9; 704/1; 707/3; 707/4
(58) Field of Classification Search .............. None
  See application file for complete search history.

(56) References Cited

U.S. PATENT DOCUMENTS 5,309,359 A    5/1994    Katz (Continued)

FOREIGN PATENT DOCUMENTS

EP    0 886 226 A1    12/1998

(Continued)

OTHER PUBLICATIONS

Office Action dated Nov. 5, 2007 in corresponding European Patent Application No. 01 944 033.8—2201.

(Continued)

*Primary Examiner*—Matthew J Sked
(74) *Attorney, Agent, or Firm*—Buchanan Ingersoll & Rooney PC

(57) ABSTRACT

A method, a system and a computer program for extracting information from a natural language text corpus based on a natural language query are disclosed. The natural language text corpus is indexed and stored. A natural language query is analyzed with respect to phrases, phrase types, syntactic roles, word tokens of phrases, and lexical meaning of word tokens. One or more surface variants are created for at least one phrase of the natural language query. The one or more surface variants each have the same phrase type as the at least one phrase of the natural language query, and each comprise a word token which is a lexical head and has the same lexical meaning as a word token which is a lexical head of the at least one phrase of the natural language query. The one or more surface variants and the at least one phrase of the natural language query are compared with the indexed and stored natural language text corpus. Portions of text are extracted from the indexed and stored natural language text corpus, which portions comprise a string of word tokens that matches any one of said surface variants or said at least one phrase of the natural language query.

7 Claims, 3 Drawing Sheets

U.S. PATENT DOCUMENTS

| | | | |
|---|---|---|---|
| 5,331,556 A * | 7/1994 | Black et al. ................ | 704/9 |
| 5,519,608 A | 5/1996 | Kupiec | |
| 5,696,962 A | 12/1997 | Kupiec | |
| 5,794,050 A | 8/1998 | Dahlgren et al. | |
| 5,933,822 A * | 8/1999 | Braden-Harder et al. ....... | 707/5 |
| 5,963,940 A | 10/1999 | Liddy et al. | |
| 6,901,399 B1 * | 5/2005 | Corston et al. ................ | 707/6 |
| 6,965,857 B1 * | 11/2005 | Decary ........................ | 704/9 |

FOREIGN PATENT DOCUMENTS

| WO | WO 97/38376 | 10/1997 |
|---|---|---|
| WO | 99/05621 A1 | 2/1999 |

OTHER PUBLICATIONS

A. Arampatzis et al., An Evaluation of Linguistically-Motivated Indexing Schemes, 2000.

R. Pohlman et al., The Effects of Sytactic Phrase Indexing on Retrieval Performance for Dutch Texas, 1997.

A. Arampatzis et al., Phrase-Based Information Retrieval, 1998.

AltaVista Search Developer's Kit 97, Dec. 1997, [This document is a compilation of the HTML files available with the installed software,] Maynard, Massachusetts, pp. 1 to 43 plus Al to A7.

Cunningham H. et al., 1997, Software Infrastructure for Natural Language Processing, in Proceedings of *Fifth Conference on Applied Natural Language Processing* (Mar. 31-Apr. 3, 1997, Washington, DC, USA), Association for Computational Linguistics, pp. 237 to 244.

Grishman, R. & the TIPSTER Phase III Contractors, 1998, *TIPSTER Text Architecture Design*, Version 3,1 Oct. 7, 1998, New York University, pp. 1 to 62.

McKelvie, D., Brew, C. & Thompson, H., 1997, Using SGML as a basis for a data-intensive NLP, in Proceedings of *Fifth Conference on Applied Natural Language Processing* (Mar. 31-Apr. 3, 1997, Washington, DC, USA), Association for Computational Linguistics, pp. 229 to 236.

Wilks, Y. & Gaizauskas, R., 1999, LaSIE jumps the Gate, in T. Strzalkowski (ed.), *Natural Language Information Retrieval*, Kluwer Academic Publishers, the Netherlands, pp. 197 to 214.

Zajac, R. Casper, M. & Sharples, N., 1997, An open distributed architecture for reuse and integration of heterogeneous NLP components, in Proceedings of *Fifth Conference on Applied Natural Language Processing* (Mar. 31-Apr. 3, 1997, Washington, DC, USA), Association for Computational Linguistics, pp. 245 to 252.

Arampatzis et al., "*Linguistically-Motivated Information Retrieval*", Sep. 1999, Technical Report CSI-R9918, University of Nijmegen, The Netherlands, pp. 1 to 24.

Dragomir et al.,"*Ranking Suspected Answers to Natural Language Questions Using Predictive Annotation,*" May 2000, ANLP 2000, Seattle, WA, pp. 1 to 8.

\* cited by examiner

| the city | was | destroy | ed | by | the enemy |
|---|---|---|---|---|---|
| $N_2$ | be v | V | v | | $N_1$ |

METHOD AND SYSTEM FOR INFORMATION EXTRACTION

This is a Continuation Patent Application of U.S. patent application Ser. No. 11/032,075, filed Jan. 11, 2005 (now U.S. Pat. No. 7,194,406, granted Mar. 20, 2007), which is a Divisional Patent Application of U.S. patent application Ser. No. 09/599,563, filed Jun. 23, 2000 (now U.S. Pat. No. 6,842,730, granted Jan. 11, 2005), and claims priority under 35 U.S.C. 119(a)-(d) for the filing of Swedish Application No. 0002368-9, filed Jun. 22, 2000.

FIELD OF THE INVENTION

The present invention relates to the field of information retrieval from unrestricted text in different languages. Specifically, the present invention relates to a method, and a corresponding system, for extracting information from a natural language text corpus based on a natural language query.

BACKGROUND OF THE INVENTION

The field of automatic retrieval of information from a natural language text corpus has in the past been focused on the retrieval of documents matching one or more key words given in a user query. As an example, most conventional search engines on the Internet use Boolean search for matches with the key words given by the user. Such key words are standardly considered to be indicative of topics and the task of standard information retrieval system has been seen as matching a user topic with document topics. Due to the immense size of the text corpus to be searched in information retrieval systems today, such as the entire text corpus available on the Internet, this type of search for information has become a very blunt tool for information retrieval. A search will most likely result in an unwieldy number of documents. Thus, it will take a lot of effort from the user to find the most relevant documents among the documents retrieved. Furthermore, due to the ambiguity of words and the way they are used in a text, many of the documents retrieved will be irrelevant. This will make it even more difficult for the user to find the most relevant documents.

The performance of an information retrieval system is usually measured in terms of its recall and its precision. In information retrieval, the technical term recall has a standard definition as the ratio of the number of relevant documents retrieved for a given query over the total number of relevant documents for that query. Thus, recall measures the exhaustiveness of the search results. Furthermore, in information retrieval, the technical term precision has a standard definition as the ratio of the number of relevant documents retrieved for a given query over the total number of documents retrieved. Thus, precision measures the quality of the search results. Due to the many documents retrieved when using the above type of search methods, it has been realized within the art that there is a need to reduce the number of retrieved documents to the most relevant ones. In other words, as the number of documents in the text corpus increases, recall becomes less important and precision becomes more important. Thus, suppliers of systems for information retrieval have enhanced Boolean search by using relevance ranking metrics based on statistical methods. However, it is well known that thus highly ranked documents still comprise irrelevant documents. This is due to the fact that the matching is too coarse and does not take the context in which the matching words occur into account. In order to find the documents that are relevant to a user query, there is a need for the information retrieval system to in some way understand the meaning of a natural language query and of the natural language text corpus from which the information is to be extracted.

There are proposals within the art of how to create an information retrieval system that can find documents in a natural language text corpus that match a natural language query with respect to the semantic meaning of the query.

Some of these proposals relate to systems that have been extended with specific world knowledge within a given domain. Such systems are based on an extensive database of world knowledge within a single area. Creating and maintaining such databases of world knowledge is a well-known knowledge engineering bottleneck. Furthermore, such databases scale poorly and a database within one domain can not be ported to another domain. Thus, it would not be feasible to extend such a system to a general application for finding information in unrestricted text, which could relate to any domain.

Other proposals are based on underlying linguistic levels of semantic representation. In these proposals, instead of using verbatim matching of one or more key words, a semantic analysis of the natural language text corpus and the natural language query is performed and documents are returned that match the semantic content meaning of the query. However, creating a deep level semantic representation of very large natural language text corpora is a complex and demanding task. This is due to a multi-level representation of the text, different analysis tools for different levels and propagation of errors from one level to another. Because representations at different levels are interdependent and for reasons given above the resulting analyses will be fragile and error prone.

SUMMARY OF THE INVENTION

An objective of the present invention is to provide an improved method, and a corresponding system, for extracting information from a natural language text corpus, that is not subject to the foregoing disadvantages of existing methods for these tasks. This object is achieved by a method and a system according to the accompanying claims.

The present invention is based on the recognition that there is a close relationship 1) between the syntactic relations between constituents in clauses and sentences in a natural language text corpus and the semantic relations between them and 2) between word tokens within constituents and the structural and semantic relations between them. More specifically, the present invention is based on the recognition that these syntactic-semantic relationships can be used when matching a natural language query with a natural language text corpus to find text portions in the natural language text corpus that have the same meaning as the natural language query.

According to one aspect of the invention a method for extracting information from a natural language text corpus based on a natural language query is provided. In the method the natural language text corpus is analyzed with respect to surface structure of word tokens and surface syntactic roles of constituents, and the analyzed natural language text corpus is then indexed and stored. Furthermore a natural language query is analyzed with respect to surface structure of word tokens and surface syntactic roles of constituents. From the analyzed natural language query one or more surface variants are then created, where these surface variants are equivalent to the natural language query with respect to 1) lexical meaning of word tokens and 2) surface syntactic roles of constituents. The surface variants are then compared with the indexed and stored analyzed natural language text corpus, and each portion of text comprising a string of word tokens that matches the one of said surface variants or said natural language query is extracted from the indexed and stored analyzed natural language text corpus.

In "surface structure of word tokens" and "surface syntactic roles of constituents" the term "surface" indicates that the word tokens and constituents are considered as they appear and in the order they appear in the text, and the term "constituents" refers to the basic parts of the text, such as word tokens, phrases etc. An important property of these features is that they can be found using a single-level analysis, e.g. using shallow parsing. For example the constituents always consist of word tokens that are contiguous in the text.

By analyzing the natural language query with respect to surface structure of word tokens and surface syntactic roles of constituents it is possible to create surface variants of the analyzed natural language query that maintain the lexical meaning of word tokens and the surface syntactic roles of constituents. These variants together with the natural language query form a set of alternative ways of expressing the same meaning as the original natural language query. The creation of variants utilizes the fact that the surface syntactic roles of the constituents together with the lexical meaning of the word tokens are closely connected to the meaning of a natural language text unit, such as a sentence, phrase or clause. The variants that have been created are then compared with an indexed and stored analyzed text corpus, where the natural language text corpus has been analyzed in the same manner as the natural language query. Since not only the natural language query, but all variants as well are compared, the number of matches is increased relative to what it would be if the matching were verbatim. However, due to the fact that the lexical meaning of word tokens and the surface syntactic roles of constituents are preserved in the variants of the natural language query, it is ensured that matches in the natural text corpus have the same meaning as the natural language query.

One advantage of the invention is that it uses a single-level analysis of the natural language text corpus and the natural language query, as opposed to known methods that use multi-level analyses, which makes the invention faster and more reliable. At the same time, its precision is high and the amount of retrieved information is manageable. Furthermore, the creation of variants makes it possible to minimize the amount of work carried out during the comparison of the natural language query with the natural language text corpus. The analysis of the natural text corpus can be done in advance and be stored in an index. This limits the analysis to be done in real time to the analysis of the natural language query. Thus, the method according to the invention is significantly faster than the known methods using linguistic analysis.

In an embodiment of the invention the surface syntactic roles of constituents are head and modifier roles, and grammatical relations. By maintaining these roles when creating surface variants of the natural language query the surface variants will express the same meaning as the natural language query.

In another embodiment of the invention, a string of word tokens in said indexed and stored analyzed natural language text corpus matches one of the surface variants, or the analyzed natural language query, if it comprises the head words of phrases bearing the grammatical relations of subject, object, and the lexical main verb in said one of the surface variants or the analyzed natural language query in the same linear order as in said one of the surface variants or the analyzed natural language query. In this way the matching becomes straightforward and thus, the method becomes faster. It is to be noted that the number of variants created may be reduced when at the same time the matching is relaxed. However, there is always a trade-off between the time for the analysis that needs to be done during matching and the time for matching a number of variants.

In a preferred embodiment, the analysis of the natural language text corpus and the natural language query comprises the steps of determining a morpho-syntactic description for each word token, locating phrases, determining a phrase type for each of the phrases, and locating clauses. Furthermore, for each word token of said natural language text corpus, a unique word token location identifier is provided and information regarding the location of each word token, each phrase of each type, and each clause in said natural language text corpus is stored, based on said unique word token location identifiers. The information regarding the location of a word token is preferably a word type associated to the word token and its unique word token location identifier logically linked to the stored associated word type. In this way each word type is only stored once instead of storing each word token of the natural language text corpus. This is especially advantageous in cases where the natural language text corpus is large. Furthermore, the information regarding the location of a phrase is preferably the phrase type of the phrase and a unique phrase location identifier logically linked to the stored phrase type, wherein the unique phrase location identifier identifies the word tokens spanned by the phrase. The information regarding the location of a clause is preferably a unique clause location identifier identifying the word tokens and phrases spanned by the clause. Similar identifiers are preferably stored for sentences, paragraphs and documents located in the natural text corpus. In this embodiment the matching is significantly simplified since a word token in a natural language query can be matched with word tokens in the natural language text corpus by finding the word type of the word token and directly extracting the stored word token identifiers associated with this word type. Furthermore, the phrase type of the word token in the natural language query is then used to see if any of the matching word tokens in the natural language text corpus is included in a phrase of the same type. This is easily done since the stored unique phrase location identifiers, which are associated with this phrase type, identifies the word tokens that are spanned by each phrase.

Furthermore, in yet another embodiment, the portion of text that is extracted is either the matching string of word tokens, a clause comprising the matching string of word tokens, a sentence comprising the matching string of word tokens, a paragraph comprising the matching string of word tokens, or a document comprising the matching string of word tokens. This embodiment enables the extraction of other portions of text than the whole document where a matching string is found. This is a significant simplification for a user, since the amount of manual post-analysis, in the form of searching the extracted documents in order to find the information of interest, that is needed can be minimized. Taken together with the preferred embodiment above the different portions of text can easily be found due to the way the natural language text corpus has been indexed and stored.

According to a second aspect of the invention a system for extracting information from a natural language text corpus based on a natural language query is provided. The system comprises a text analysis unit for analyzing a natural language text corpus and a natural language query with respect to surface structure of word tokens and surface syntactic roles of constituents. To the analysis unit storage means for storing the analyzed natural language text corpus are operatively connected to said text analysis unit. Furthermore the system comprises an indexer, operatively connected to the storage means, for indexing the analyzed natural language text corpus, and an index, operatively connected to the indexer, for storing said indexed analyzed natural language text corpus. The system also comprises a query manager, operatively connected to the text analysis unit, comprising means for creating surface variants of the natural language query, said surface variants being equivalent to said natural language query with respect to lexical meaning of word tokens and surface syntactic roles of constituents, and means for comparing said surface variants and the analyzed natural language query with the indexed analyzed natural language text corpus in said index. Finally, the system comprises a result manager, operatively connected to the index, for extracting, from the indexed and stored analyzed natural language text corpus, each portion of text comprising a string of word tokens that matches any one of the surface variants or the analyzed natural language query.

The invention further provides a computer-readable medium that stores computer-executable instructions for performing the steps of the above method of extracting information from a natural language text corpus based on a natural language query.

By way of example, computer-readable media may comprise computer storage media and communication media, as is well known to a person skilled in the art, computer storage media includes both volatile and non-volatile, removable and non-removable media implemented in any method or technology for storage of information such as computer readable instructions, data structures, program modules or other data. Computer storage media includes, but is not limited to, RAM, ROM EEPROM, flash memory or other memory technology, CD-ROM, digital versatile disks (DVD) or other optical disk storage, magnetic cassettes, magnetic tape, magnetic disk storage or other magnetic storage devices, or any other tangible medium which can be used to store the desired information and which can be accessed by a computer. Further, it is known to the skilled person that communication media typically embodies computer-readable instructions, data structures, and program modules.

Thus, by recognizing the fact that there is more information regarding the meaning of a natural language text inherent in the surface structural and semantic relations between constituents and word tokens of the natural language text, and by using an expansion of a natural language query into surface variants that maintain the lexical meaning of word tokens and surface syntactic roles of constituents of the original natural language query, an improved method for information extraction can be achieved that is fast, reliable and that has a high precision.

BRIEF DESCRIPTION OF DRAWINGS

In the following, the present invention is illustrated by way of example and not limitation with reference to the accompanying drawings, in which.

DETAILED DESCRIPTION OF THE INVENTION

Figure 1:
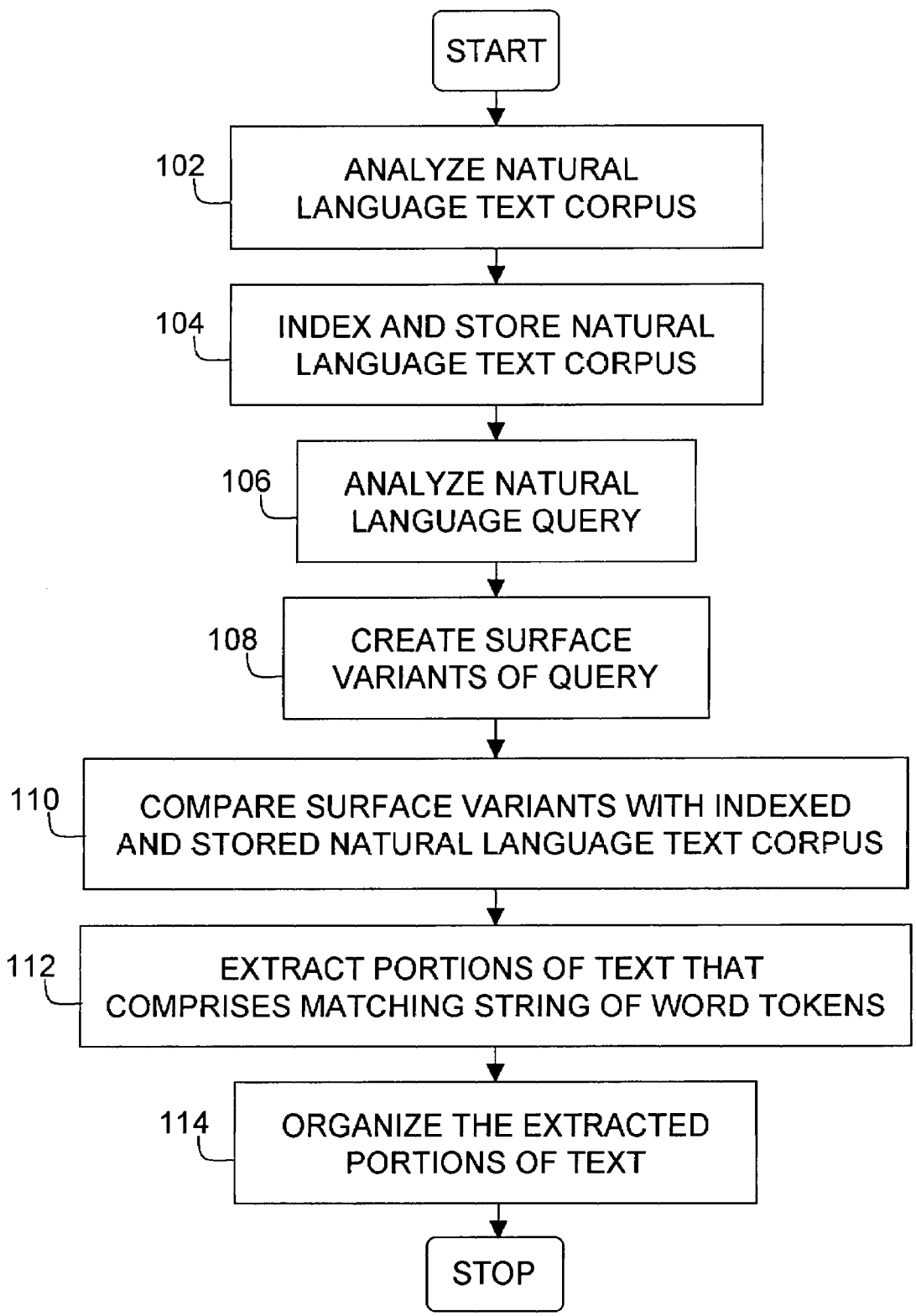
FIG. 1 is a flowchart of a method according to the invention.

FIG. 1 is a flowchart of a method according to the invention. In the method information is extracted from a natural language text corpus based on a natural language query. One example of a natural language text corpus is a subset of the information found in web servers on the Internet. To be able to use linguistic properties of the text corpus in order to match a natural language text query against the natural text corpus the natural language text corpus is analyzed, in step 102, with respect to surface structure of the word tokens and the surface syntactic roles of the constituents of the natural language text corpus. This is done in order to determine morpho-syntactic description for each word token, locate phrases, determine a phrase type for each of the phrases, and locate clauses. The morpho-syntactic description comprises a part-of-speech and an inflectional form, and the phrase types comprise subject noun phrase, object noun phrase, other noun phrases and prepositional phrases. A clause can be defined as a unit of information that roughly corresponds to a simple proposition, or fact. An example of an analyzed clause will be described below with reference to FIG. 2.

After the natural language text corpus has been analyzed it is indexed and stored in step 104 of FIG. 1. In this step the spaces between each word token are numbered consecutively, whereby the location of each word token is uniquely defined by the numbers of the two spaces it is located between in the natural language text corpus. These two numbers form a unique word token location identifier. An alternative numbering scheme where each word token is consecutively numbered is also within the scope of the invention. Since each word token is associated with a word type it is sufficient to store all of the word types of the natural language text corpus and then, for each of the stored word types, store the word token location identifier of each word token associated to this word type. Furthermore, the location of a phrase is uniquely defined by the number of the space preceding the first word token of the phrase and the number of the space succeeding the last word token of the phrase. These two numbers form a phrase location identifier. Thus, each phrase type is stored and the phrase location identifier of each of the phrases of this phrase type is stored. Note that, due to the way the phrase location identifier is defined, it is easy to find out whether a word token is of a certain type by determining whether the word token location identifier is within a phrase of this type. The location of a clause is uniquely defined by the number of the space preceding the first word token and the number of the space succeeding the last word token of the clause. These two numbers form a clause location identifier. Each of the clause location identifiers is stored. A sentence, a paragraph, and a document location identifier is formed in an equivalent manner and each of them are stored. After step 104 a natural language query is analyzed, in step 106, in the same manner as the natural language text corpus was analyzed in step 102.

In step 108 of FIG. 1, a number of surface variants of the analyzed natural language query are created. The surface variants are created in such a manner that the lexical meaning of word tokens and the surface syntactic roles of constituents of the natural language query are preserved. In other words, each word token of the natural language query may be replaced with one or more word tokens that have the same lexical meaning and the word tokens may be rearranged as long as each constituent of a variant has an equivalent surface syntactic role as the corresponding one in the natural language query. A surface syntactic role is for example, head, modifier, subject noun phrase, object noun phrase etc. An example of a number of variants of a query will be described below with reference to FIG. 3A-C.

When the surface variants have been created they and the natural language query are compared, in step 110 of FIG. 1, with stored natural language text corpus. In the comparison a word token in a surface variant is compared with the stored word types of the natural language text corpus and the word token location identifiers of the word tokens of the same word type as the word token in the surface variant are identified. The identified word token location identifiers are then used to determine the word tokens in the natural language text corpus that are included in a phrase of the same type as the word token in the surface variant. This is done by searching the phrase location identifiers associated with the phrase type the word token in the surface variant is included in and determining which of the identified word token location identifiers are included in one of these phrase location identifiers. This comparison is done for each word token in the variant and except for determining if the word token is included in the same phrase type it is determined if the word tokens are included in the same clause. This can be done easily by determining if the word token location identifiers are included in the same clause location identifier.

When all the surface variants and the natural language query has been compared in step 110, each portion of text comprising a string of word tokens that matches any one of the surface variants or the analyzed natural language query are extracted in step 112 of FIG. 1. A string of word tokens in the natural language text corpus matches a surface variant if it comprises the head words of phrases bearing the grammatical relations of subject, object, and lexical main verb in the surface variant in the same linear order as in the surface variant.

Finally, in step 114 of FIG. 1, the extracted portions of text are organized. This is done such that the portions of text are grouped according to degree of correspondence with the query with respect to lexical meaning of word tokens and surface syntactic roles of constituents. The degree of correspondence can be described such that a constituent in a portion of text having the same lemma as the equivalent constituent of the query is considered to have a higher degree of correspondence than a constituent in a portion of text being a synonym to the equivalent constituent of the query. Furthermore, the extracted portions of text are organized such that said portions of text are grouped according to sameness of grammatical subject, grammatical object, and lexical main verb.

In the following an example of an analyzed natural language query will be given with reference to FIG. 2. In the examples a number of abbreviations will be used which are explained in the table below:

| Abbreviation | Description |
| --- | --- |
| AT | Article |
| NN | Singular noun |
| VBD | Verb, past tense |
| nps | Subject noun phrase |
| npo | Object noun phrase |
| vp | Verb phrase. |

Figure 2:
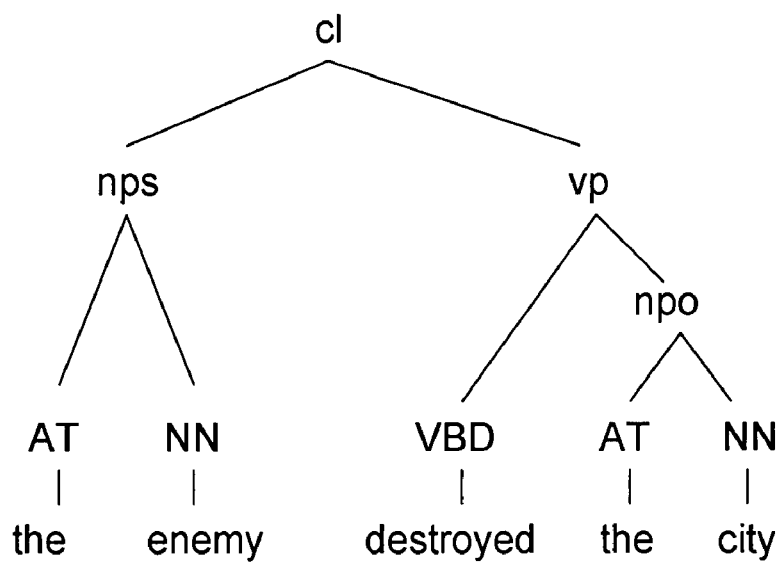
FIG. 2 is an illustration of an example of a natural language query and its constituents.

In FIG. 2, an illustration of an example of a natural language query and its constituents and grammatical relations are shown. Note that this could just as well be a part of a natural language text corpus. The example query is "the enemy destroyed the city". The query is in this case a single clause that has the two main constituents "the enemy" which is a subject noun phrase nps and "destroyed the city" which is a verb phrase vp. The constituent "the enemy" in turn consists of the two constituents "the" which is an article AT and "enemy" which is a singular noun NN. The constituent "destroyed the city" consists of the two constituents "destroyed" which is a verb in past tense VBD and "the city" which is a object noun phrase npo. The constituent "the city" in turn consists of the constituents "the" which is an article AT and "city" which is a singular noun NN.

Figure 3A:
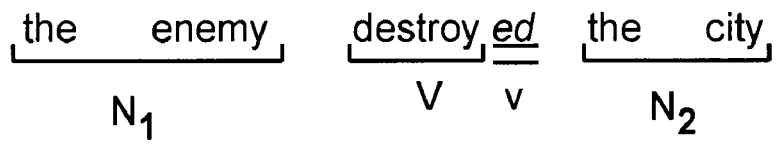
FIG. 3A-C are illustrations of the natural language query of FIG. 2 and surface variants thereof.
Figure 3B:
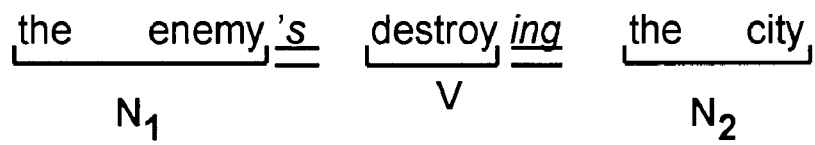
Figures 3C, 4:
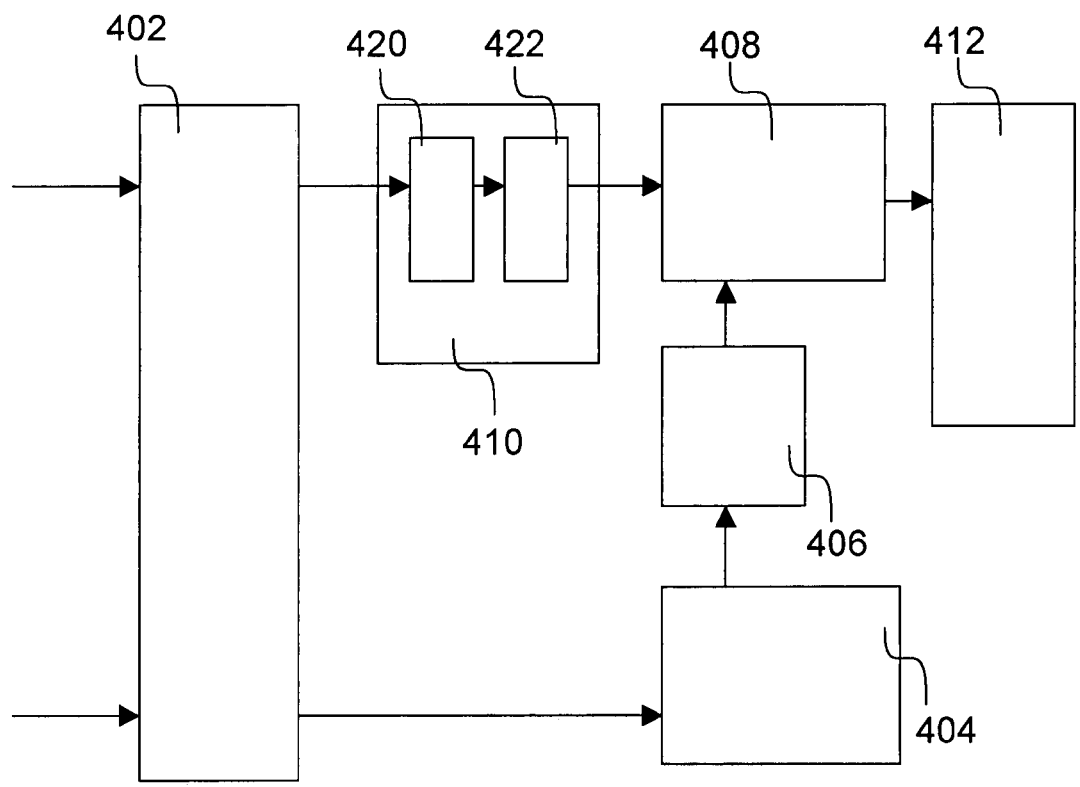
FIG. 4 is a schematic diagram of a system according to the invention.

In FIG. 3A-C illustrations of the natural language query of FIG. 2 and two different surface variants thereof are given. The method for generating variants of a linguistic expression that constitutes a query is partly based on Zellig Harris' notion of transformation as defined in Harris, Z., Co-occurrence and transformation in linguistic structure, Language 33 (1957), pp. 283-340, with the important difference that the method of the present invention makes use of the notion of 'initial clause' where Harris uses the traditional notion 'sentence'. For a description of 'initial clause', reference is made to the co-pending Swedish patent application 0002034-7, entitled "Method for segmentation of text", incorporated herein by reference and assigned to the assignee hereof.

Harris' 1957 paper defines a formal relation among sentences, by virtue of which one sentence structure may be called a transform of another sentence. This relation is based on comparing the individual co-occurrences of morphemes. By investigating the individual co-occurrences of morphemes in sentences, it is possible to characterize the distribution of classes of morphemes that are not easily defined in ordinary linguistic terms. Harris' transformations are defined based on two structures having the same set of individual co-occurrences of morphemes: "If two or more constructions which contain the same n classes (whatever else they may contain) occur with the same n-tuples of members of these classes in the same sentence environment, we say that the constructions are transforms of each other, and that each may be derived from any other of them by a particular transformation."

In the examples in FIG. 3A-3C illustrating a natural language query and transformations to surface variants thereof, the following notation for morpheme and word classes is used: N (noun), V (verb), v (tense and verb auxiliary class), T (article), P (preposition), C (conjunction), and D (adverb).

For example, the constructions N v V N (a sentence) in FIG. 3A and N's Ving N (a noun phrase) in FIG. 3B are satisfied by the same triplets N, V, N (enemy, destroy, city) so that any choice of members which we find in the sentence, we also find in the noun phrase and vice versa: The enemy destroyed the city, the enemy's destroying the city. Where the class members are identical in the two or more constructions, Harris calls the transformation reversible, and writes it as $N_1$ v V $N_2$ ← → $N_1$'s Ving $N_2$ (and the set of triples for the first=the set for the second). The same subscript means the same member of the class: the second appearance of $N_1$ indicates the same morpheme as the first $N_1$. This example illustrates a first generic transformation that is used when creating surface variants of a natural language query. The transformation has the property that it maintains the lexical meaning of word tokens and surface syntactic roles of constituents of the natural language query. Thus, if we have the natural language query of FIG. 3A the surface variant of FIG. 3B can be created using the transformation:

$$N_1 vV N_2 \rightarrow N_1 \text{'s Ving } N_2$$

In some cases, all the n-tuples which satisfy one construction (i.e. for which that construction actually occurs) also satisfy the other construction, but not vice versa. For example, every triple of $N_1$, V, and $N_2$ in the $N_1$ vV $N_2$ 'active' sentence in FIG. 3A can also be found, in reverse order, in the $N_2$ v be Ven by N1 'passive' sentence in FIG. 3C: The enemy destroyed the city, The city was destroyed by the enemy. This example illustrates a second generic transformation that is used when creating surface variants of a natural language query. The transformation also has the property that it maintains the lexical meaning of word tokens and surface syntactic roles of constituents of the natural language query. Thus, if we have the natural language query of FIG. 3A the surface variant of FIG. 3C can be created using the transformation:

$$N_1 vVN_2 \rightarrow N_2 \text{ v be Ven by N1}$$

Note that some triplets only satisfy the second sequence and not the first: The wreck was seen by the seashore. Such cases Harris calls one-directed or nonreversible transformations: $N_1$ v V $N_2 \rightarrow N_2$ v be Ven by N1

These two types of transformations for creating surface variants are only examples. Other similar transformations are obvious to the person skilled in the art and are considered to be within the scope of the invention.

Turning now to FIG. 4, a schematic diagram of a system according to the invention is shown. The system comprises a text analysis unit 402, memory means 404, an indexer 406, an index 408, a query manager 410, a result manager 412, means 420 for creating surface variants, comparing means 422. The text analysis unit 402 is arranged to analyze a natural language text input, such as a natural language query or a natural language text corpus. The analysis is done in order to determine a morpho-syntactic description for each word token of the natural language input, locate phrases in the natural language input, determine a phrase type for each of the phrases, and locate clauses in the natural language input. The morpho-syntactic description comprises a part-of-speech and an inflectional form, and the phrase types comprises subject noun phrase, object noun phrase, other noun phrases and prepositional phrases.

In FIG. 4, the memory means 404, operatively connected to the text analysis unit 402, are arranged to store a natural language text corpus that has been analyzed by the text analysis unit 402. Furthermore, the indexer 406, operatively connected to the memory means 404, is arranged to index a natural language text corpus that is stored in the memory means 404. The indexing is based on a numbering scheme where the spaces between each word token are numbered consecutively. An alternative numbering scheme where each word token is consecutively numbered is also within the scope of the invention. Each word token is then defined by its word type and the numbers of the two spaces it is located between in the natural language text corpus. The two numbers of the spaces between which a word token is located form a word token location identifier for this word token. Furthermore, a phrase is uniquely defined by its phrase type and the number of the space preceding the first word token of the phrase and the number of the space succeeding the last word token of the phrase. The number of the space preceding the first word token of a phrase and the number of the space succeeding the last word token of the phrase form a phrase location identifier for this phrase. Similarly, a clause, a sentence, a paragraph and a document location identifier, respectively, is defined as the number of the space preceding its first word token and the number of the space succeeding its last word token. The word types, word token location identifiers, phrase types, phrase location identifiers, clause location identifiers, paragraph location identifiers, sentence location identifiers and document location identifiers are stored in the index that is operatively connected to the indexer. The logical structure of the index is shown in the table below: In FIG. 4, the memory means 404, operatively connected to the text analysis unit 402, are arranged to store a natural language text corpus that has been analyzed by the text analysis unit 402. Furthermore, the indexer 406, operatively connected to the memory means 404, is arranged to index a natural language text corpus that is stored in the memory means 404. The indexing is based on a numbering scheme where the spaces between each word token are numbered consecutively. An alternative numbering scheme where each word token is consecutively number is also within the scope of the invention. Each word token is then defined by its word type and the numbers of the two spaces it is located between in the natural language text corpus. The two numbers of the spaces between which a word token is located form a word token location identifier for this word token. Furthermore, a phrase is uniquely defined by its phrase type and the number of the space preceding the first word token of the phrase and the number of the space succeeding the last word token of the phrase. The number of the space preceding the first word token of a phrase and the number of the space succeeding the last word token of the phrase form a phrase location identifier for this phrase. Similarly, a clause, a sentence, a paragraph and a document location identifier, respectively, is defined as the number of the space preceding the its first word token and the number of the space succeeding its last word token. The word types, word token location identifiers, phrase types, phrase location identifiers, clause location identifiers, paragraph location identifiers, sentence location identifiers and document location identifiers are stored in the index that is operatively connected to the indexer. The logical structure of the index is shown in the table below:

| Text Unit | Location Identifiers $<i, j>$ |
| --- | --- |
| word type n | Word token location identifiers |
| word type n | Word token location identifiers |
| ... | |
| word type n | Word token location identifiers |
| nps | Phrase location identifiers |
| npo | Phrase location identifiers |
| npx | Phrase location identifiers |
| pp | Phrase location identifiers |
| cl | Clause location identifiers |
| s | Sentence location identifiers |
| p | Paragraph location identifiers |
| doc | Document location identifiers |

Where nps=subject noun phrase, npo=object noun phrase, npx=other noun phrase, pp.=prepositional phrase, cl=clause, s=sentence, p=paragraph and doc=document. The logical structure of the index illustrated in the table is based on a hierarchy of text units that are related by inclusion. The purpose of the multi-layered structure of the index is that, in combination with the invention's shared location system for text units of different kinds, it supports a search technique that permits rapid access to those corpus text units that match the set of complex constraints imposed by a given query and its surface variants.

In FIG. 4, the query manager 410 is operatively connected to the text analysis unit 402 and comprises means 420 for creating surface variants of a natural language query that has been analyzed in the text analysis unit 402. The created surface variants all have the property that the lexical meaning of its word tokens and the surface syntactic roles of its constituents are equivalent to the lexical meaning of the word tokens of the natural language query and the surface syntactic roles of the constituents of the natural language query, respectively. In other words, when a surface variant is created, each word token of the natural language query may be replaced with one or more word tokens that have the same lexical meaning and the word tokens may be rearranged as long as each constituent of a variant has an equivalent surface syntactic role as the corresponding one in the natural language query. A surface syntactic role is for example, head, modifier, subject noun phrase, object noun phrase etc. Furthermore, the query manager comprises comparing means 422 for comparing the surface variants created in the surface variant unit and the natural language query with analyzed natural language text corpus stored in the index. The comparing means 422 use the structure of the index in order to do the comparison. By determining the word type of a word token in a surface variant the word token location identifiers index associated with the determined word type can be identified in the index. Furthermore, since the phrase type the word token is in has been determined in the text analysis unit, it can be determined which of the identified word token location identifiers are included in a phrase of the same type as the word token in the surface variant. This is done by searching the phrase location identifiers associated with the phrase type the word token in the surface variant is included in and determining which of the identified word token location identifiers are included in one of these phrase location identifiers. This comparison is done for each word token in the variant and except for determining if the word token is included in the same phrase type, the index is used to determine if the word tokens are included in the same clause.

Finally, in FIG. 4, the system comprises a result manager 412, operatively connected to the index 412, for extracting each portion of text comprising a string of word tokens that matches any one of the surface variants or the natural language query. A string of word tokens in the natural language text corpus matches a surface variant if it comprises the main words of phrases bearing the grammatical relations of subject, object, and lexical main verb in the surface variant in the same linear order as in the surface variant. The portion of text to be extracted can be chosen as the string of word tokens itself or the clause, the sentence, the paragraph or the document that the string of word tokens are included in. The extraction means use the index to find the proper clause, sentence, paragraph and document by consulting the respective location identifiers in the index.

The invention claimed is:

1. A method for extracting information from a natural language text corpus based on a natural language query, the method being implemented in a system that includes a text analysis unit, a storage device, an indexer, and a query manager, the method comprising the steps of:

indexing and storing the natural language text corpus in the storage device;

analyzing a natural language query with respect to phrases, phrase types, syntactic roles, word tokens of phrases, and lexical meaning of word tokens;

creating one or more surface variants for at least one phrase of the natural language query, said one or more surface variants each having the same phrase type as said at least one phrase of the natural language query, and each comprising a word token being a lexical head and having the same lexical meaning as a word token being a lexical head of said at least one phrase of the natural language query;

comparing said one or more surface variants and said at least one phrase of the natural language query with the indexed and stored natural language text corpus; and extracting from said indexed and stored natural language text corpus, portions of text comprising a string of word tokens that matches any one of said surface variants or said at least one phrase of the natural language query.

2. The method of claim 1, wherein the natural language query is further analyzed with respect to lemmas of word tokens and wherein the step of creating comprises:

creating one or more surface variants for at least one phrase of the natural language query, said one or more surface variants each having the same phrase type as the at least one phrase of the natural language query, and each comprising a word token being a lexical head and having the same lemma as a word token being a lexical head of the at least one phrase of the natural language query.

3. The method according to claim 1, further comprising analyzing the natural language text corpus with respect to phrases, phrase types, syntactic roles, word tokens of phrases, and lexical meaning of word tokens.

4. The method of claim 3, further comprising the step of analyzing said natural language text corpus with respect to location of clauses wherein the step of extracting comprises:

extracting, from the indexed and stored analyzed natural language text corpus, portions of text comprising clauses which in turn comprises a string of word tokens that matches any one of said surface variants or said at least one phrase of the natural language query.

5. The method of claim 1, wherein the step of creating comprises:

creating one or more surface variants for at least one phrase of the natural language query, said one or more surface variants each having the same phrase type as the at least one phrase of the natural language query, each comprising a word token being a lexical head and having the same lemma as a word token being a lexical head of the at least one phrase of the natural language query, and each comprising a word token being a lexical modifier and having the same lemma as a word token being a lexical modifier of the at least one phrase of the natural language query.

6. A system for extracting information from a natural language text corpus based on a natural language query, comprising:

a text analysis unit for analyzing a natural language query with respect to phrases, phrase types, syntactic roles, word tokens of phrases, and lexical meaning of word tokens storage means operatively connected to said text analysis unit, for storing the natural language text corpus;

an indexer, operatively connected to said storage means, for indexing the natural language text corpus; an index, operatively connected to said indexer, for storing said indexed natural language text corpus;

a query manager, operatively connected to said text analysis unit, comprising means for creating surface variants for at least one phrase of the natural language query, said surface variants each having the same phrase type as said at least one phrase of the natural language query, and each comprising a word token being a lexical head and having the same lexical meaning as a word token being a lexical head of said at least one phrase of the natural language query, and means for comparing said surface variants and said at least one phrase of the natural language query with the indexed natural language text corpus in said index; and a result manager operatively connected to said index, for extracting, from said indexed and stored natural language text corpus, each portion of text comprising a string of word tokens that matches any one of said surface variants or said analyzed natural language query.

7. A computer-readable medium that stores computer-executable instructions for instructing a computer to perform a method of extracting information from a natural language text corpus based on a natural language query, the method comprising the steps of:

indexing and storing the natural language text corpus;

analyzing a natural language query with respect to phrases, phrase types, syntactic roles, word tokens of phrases, and lexical meaning of word tokens;

creating one or more surface variants for at least one phrase of the natural language query, said one or more surface variants each having the same phrase type as said at least one phrase of the natural language query, and each comprising a word token being a lexical head and having the same lexical meaning as a word token being a lexical head of said at least one phrase of the natural language query;

comparing said one or more surface variants and said at least one phrase of the natural language query with the indexed and stored natural language text corpus; and extracting from said indexed and stored natural language text corpus, portions of text comprising a string of word tokens that matches any one of said surface variants or said at least one phrase of the natural language query.

* * * * *